Patented Oct. 17, 1922.

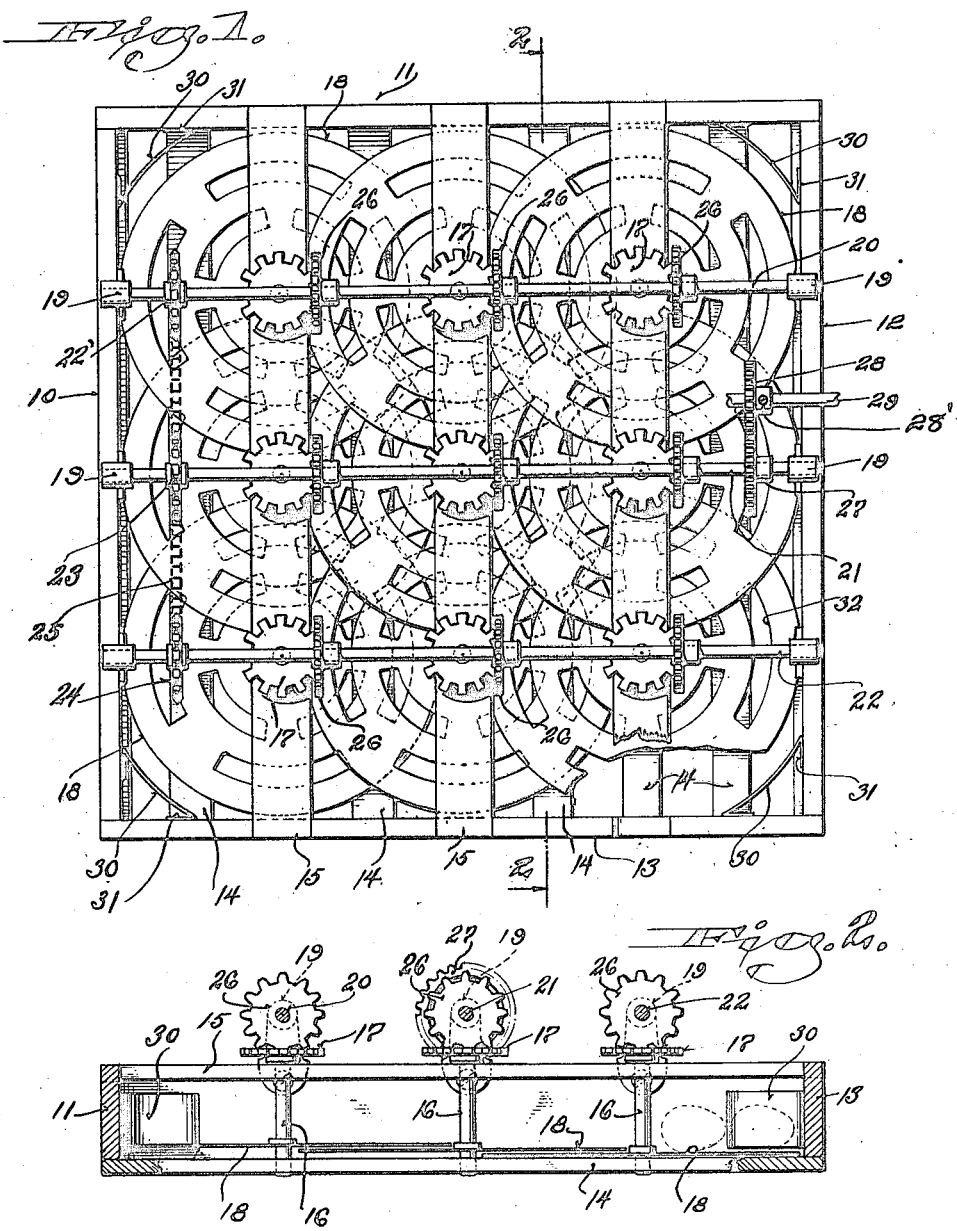

1,432,115

UNITED STATES PATENT OFFICE.

ALLIE G. MARKISEN, OF RACINE, WISCONSIN.

INCUBATOR TRAY.

Application filed December 20, 1921. Serial No. 523,654.

*To all whom it may concern:*

Be it known that I, ALLIE G. MARKISEN, a citizen of the United States, and resident of Racine, in the county of Racine and State of Wisconsin, have invented certain new and useful Improvements in Incubator Trays; and I do hereby declare that the following is a full, clear, and exact description thereof.

The invention relates to apparatus employed for the artificial incubation of eggs. An important object of the invention is the provision of manually operated means for rotating overlapped discs for the purpose of turning the eggs and equalizing the heat that is imparted to each.

An additional object is the provision of an especially simple structure easy to manufacture and operate, and durable.

In the drawing Fig. 1 is a plan view, and Fig. 2 is a section on line 2—2 of Fig. 1.

Side pieces 10, 11, 12, and 13, are provided and pieces 11 and 13 are cut away to receive bottom slats 14 and top slats 15. Top slats 15 have spaced apertures and the bottom slats 14 immediately below the top slats are similarly apertured. Vertical shafts 16 are received in these apertures and have gears 17 mounted thereon above the top slats 15 and discs 18 mounted thereon along the bottom of the incubator tray in overlapped arrangement. Side pieces 10 and 12 are provided with bearings 19 in which shafts 20, 21, and 22, are rotatably mounted. These shafts have sprockets 22', 23, and 24, rigid thereon and provided with teeth cooperative with chain 25 so that rotation shaft 21 operates through chain 25 to rotate shafts 20 and 22. Gears 26 are rigidly positioned on shafts 20, 21, and 22, and mesh with gears 17. Shaft 21 is provided with an additional gear 27 meshing with a gear 28 rigid with shaft 29 which may be suitably supported by the incubator frame and may be rotated by hand or power. A set screw 28' permits longitudinal adjustment of gear 28 so that it may be readily disconnected. Guides 30 provided with flanges 31 are suitably secured in the corners and prevent eggs from rolling off the discs.

It will be noted that the overlapped discs are such as to keep the eggs at all times on the discs and they are incapable of falling between bottom slats 14. On the rotation of shaft 29, shafts 20, 21, and 22, are turned through the medium of chain 25 and discs 18 are rotated, the direction of rotation of each being the same. The farm air is admitted between the slats and openings 32 in discs 18. These openings facilitate the carrying of the eggs. When the shaft 29 is operated the eggs are moved about and a rearrangement takes place. Eggs on the outside are gradually worked inwardly towards the center as the side discs carry them till they contact with and are transferred to adjacent discs, the overlapping of the discs facilitating a ready transfer without injurious effect on the eggs. This transfer equalizes the amount of heat given to each of the eggs.

It is apparent that the invention is capable of very considerable modification, and while I have illustrated a preferred embodiment, I do not limit myself to the details shown, but desire to avail myself of a substantial range of equivalents.

I claim as my invention:—

1. An egg tray for incubators comprising a plurality of overlapped plates for carrying eggs, and means for rotating said plates.

2. An egg tray for incubators comprising a plurality of overlapped discs, having openings therein for carrying eggs, and means for rotating said discs in the same direction.

3. An egg tray for incubators comprising a plurality of overlapped discs, a shaft on each of said discs, a gear on each of said shafts, and means for rotating said gears.

4. In an incubator egg tray, side and end members, bottom and top slats rigid therewith, a plurality of overlapped discs between said bottom slats and said top slats, and means for rotating said discs.

In testimony that I claim the foregoing I have hereunto set my hand at Milwaukee, in the county of Milwaukee and State of Wisconsin.

ALLIE G. MARKISEN.